United States Patent
Goldberg et al.

(10) Patent No.: US 7,540,141 B2
(45) Date of Patent: Jun. 2, 2009

(54) SMART FUEL CONTROL SYSTEM

(75) Inventors: Gary L. Goldberg, San Diego, CA (US); Jay M. Francisco, Chula Vista, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 538 days.

(21) Appl. No.: 11/302,552

(22) Filed: Dec. 13, 2005

(65) Prior Publication Data
US 2007/0130911 A1   Jun. 14, 2007

(51) Int. Cl.
*F02C 9/00* (2006.01)
*F02G 3/00* (2006.01)

(52) U.S. Cl. .................................................. 60/39.281
(58) Field of Classification Search .............. 60/39.281, 60/734
See application file for complete search history.

(56) References Cited
U.S. PATENT DOCUMENTS

| | | | | |
|---|---|---|---|---|
| 4,441,156 A | * | 4/1984 | Barbeau | 701/100 |
| 4,612,616 A | * | 9/1986 | Binns et al. | 701/100 |
| 4,697,238 A | * | 9/1987 | Barbeau | 701/100 |
| 5,118,258 A | * | 6/1992 | Martin | 417/3 |
| 6,836,086 B1 | * | 12/2004 | Goldberg et al. | 318/141 |
| 6,909,263 B2 | * | 6/2005 | Xu et al. | 322/29 |
| 2002/0073687 A1 | * | 6/2002 | Lipinski et al. | 60/39.094 |
| 2004/0177602 A1 | * | 9/2004 | Griffiths et al. | 60/39.281 |
| 2005/0058549 A1 | * | 3/2005 | York et al. | 417/44.2 |
| 2005/0066649 A1 | * | 3/2005 | Lorenz | 60/39.281 |
| 2006/0017328 A1 | * | 1/2006 | Bryde | 307/64 |

* cited by examiner

*Primary Examiner*—Michael Cuff
*Assistant Examiner*—Andrew Nguyen
(74) *Attorney, Agent, or Firm*—Stephen G. Mican

(57) ABSTRACT

A fuel control system uses a fuel pump powered by a variable speed pump motor controlled by a closed loop electronic feedback system that tracks motor speed and corrects fuel pump motor speed so that the fuel pump delivers flow according to a desired flow schedule based on the pressure feedback from the manifold.

20 Claims, 1 Drawing Sheet

SMART FUEL CONTROL SYSTEM

FIELD OF THE INVENTION

The invention relates to fuel systems for gas turbine engines, and more particularly to fuel control systems for gas turbine engines.

BACKGROUND OF THE INVENTION

Gas turbine engines generally have a fuel pump that transfers fuel from a fuel supply to the engine at a desired pressure and flow rate. The engine typically drives the fuel pump through a speed-reducing gearbox that couples the engine to the pump. Since the rotational speed of the pump, and therefore flow rate, is proportional to the rotational speed of the engine, it is common to use a servo-control valve to control fuel flow and a pump relief valve or pressure-regulating valve to control fuel pressure.

The gearbox driven fuel pump has several disadvantages. One is that the size of the pump has to be sufficient to provide a large quantity of fuel to the engine during start-up of the engine, wherein the light-off window is only in the range of 5 to 15 percent of normal engine operational rotational speed. The pump is therefore oversize at operational rotational speed, so that it is three or four times larger than it need be for supplying fuel at operational rotational speed, thereby contributing to excess cost, size and weight of the fuel system. Because the pump then develops excess flow at operational speed, the fuel recirculates through the pump by way of the pump relief valve, thereby contributing to unwanted heating of the fuel.

SUMMARY OF THE INVENTION

The invention overcomes the problems of the prior art fuel systems with a fuel control system that uses a fuel pump powered by a variable speed pump motor controlled by a closed loop electronic feedback system that tracks motor speed and corrects fuel pump motor speed so that the fuel pump delivers flow according to a desired flow schedule. In this case, the fuel pump only pumps the amount of fuel required by the engine.

Preferably, the pump, motor and associated motor controller with pump accessories and valving mount in a common line replaceable unit (LRU) module.

Generally, the invention comprises a fuel control system for a gas turbine engine that comprises: a fuel pump for delivering fuel from a fuel supply source to the engine; a variable speed pump motor for powering the fuel pump; a motor controller that powers the pump motor, compares the speed of the pump motor to a motor speed command signal that represents a desired fuel flow for the pump, senses any variation of the speed of the motor from the motor speed command signal and uses the resulting difference to modulate the power that it sends to the pump motor to make the pump deliver the desired fuel flow.

DETAILED DESCRIPTION OF THE INVENTION

Figure 1:
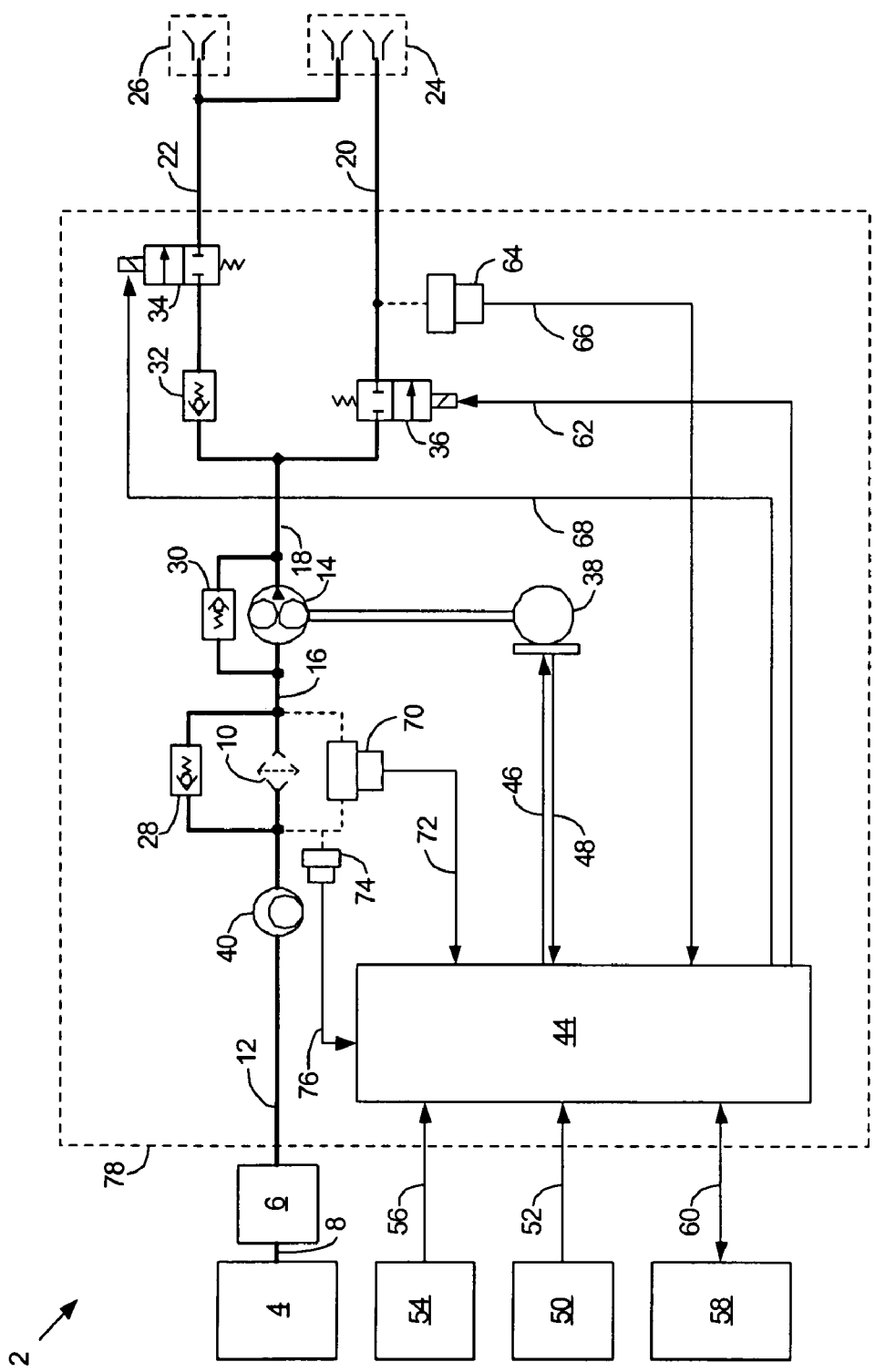
FIG. 1 is a schematic diagram of a fuel control system for a gas turbine engine according to a possible embodiment of the invention.

FIG. 1 is a schematic diagram of a fuel control system 2 for a gas turbine engine according to a possible embodiment of the invention. Fuel from a fuel supply source 4 feeds a spar valve 6 through a fuel supply line 8 for manual control of fuel flow. A fuel filter 10 filters fuel that passes through the spar valve 6 by way of a spar valve output line 12. A fuel pump 14, such as a gear pump, pumps fuel that passes through the filter 10 by way of a fuel filter output line 16. The fuel pump 14 supplies fuel through a pump supply line 18 to a start manifold 20 and a run manifold 22 for the engine. Typically, the start manifold 20 and run manifold 22 supply fuel to a plurality of duplex nozzles 24 and the run manifold 22 supplies fuel to a plurality of simplex nozzles 26. The nozzles 24 and 26 inject fuel into a combustor for the engine that ignites to provide engine power.

A fuel filter bypass valve 28 typically bypasses fuel around the fuel filter 10 in the instance that the fuel filter 10 develops an excessive pressure drop due to filter contamination. A pump bypass valve 30 typically bypasses fuel around the pump 14 in the instance that the pump develops excessive pressure in the pump supply line 18. A flow divider 32 controls the proportion of fuel directed to the start manifold 20 and the run manifold 22. A start fuel valve 64, typically a solenoid operated two-way valve, controls the flow of fuel between the pump supply line 20 and the start manifold 22. A run fuel valve 34, typically a solenoid operated two-way valve, controls the flow of fuel between the pump supply line 18 and the run manifold 22.

A variable-speed motor 38, such as a brushless direct current (DC) motor, drives the pump 14. Optionally, the motor 38 may also drive a booster pump 40, such as an impeller pump, that supplies fuel from the spar valve output line 12 to the fuel filter 10 in order to bring up fuel pressure in the system 2 more quickly. A motor controller 44, preferably of the digital signal processor (DSP) type, controls the speed of the motor 38 by way of a motor control line 46. The motor controller 44 monitors the speed of the motor 38, such as by way of a motor position signal on a motor position signal line 48. Generation of the motor position signal may be by a motor position sensor or sensorless motor position sensing means, as known in the art. The motor controller 44 supplies power to the motor 38 that it receives from a battery 50 by way of a battery supply line 52 or an engine generator 54, typically of the three-phase alternating current type, by way of a generator supply line 56.

The motor controller 44 communicates with an engine controller 58 by way of a communication bus 60. The communication bus 60 may be of any convenient type, and a controller area network (CAN) serial bus is satisfactory for this purpose. Upon start-up of the engine, the engine controller 58 sends a command signal to the motor controller 44 by way of the communication bus 60 to initiate motor control. In response, the motor controller 44 powers the pump motor 38 and opens the start fuel valve 36 with a control signal coupled to the valve 36 by way of a primary control line 62. A fuel pressure sensor 64 measures fuel pressure in the start manifold and sends a fuel pressure signal representative of this pressure to the motor controller 44 by way of a pressure signal line 66. The motor controller 44 sends a start manifold pressure signal to the engine controller 58 by way of the communication bus 60. In response, the engine controller 58 sends a command signal to the motor controller 44 by way of the communication bus 60 to maintain a desired speed for the pump motor 38 according to a fuel flow schedule based upon the measured fuel pressure.

The motor controller 44 compares the speed of the motor as determined by the motor position signal on the motor position signal line 48 with the motor speed command signal from the engine controller 58. The motor controller 44 senses any variation of the speed of the motor 38 from the speed commanded by the engine controller 58 and uses the resulting difference to modulate the power that it sends to the pump motor 38 to make the pump 14 deliver the desired fuel flow, thereby establishing a closed-loop speed control.

Upon ignition of the engine within a light-off window that is generally in the range of approximately 5 to 15 percent of operating speed, the engine controller 58 sends a command signal to the motor controller 44 to open the run fuel valve 34. In response, the motor controller 44 opens the run fuel valve 34 with a control signal coupled to the valve 34 by way of a primary control line 68. The flow divider 32 then proportions the fuel flow delivered by the pump 14 between the start manifold 20 and the run manifold 22 as the engine accelerates to its operational speed.

A differential pressure sensor 70 may measure the differential pressure developed across the fuel filter 10 and send a differential pressure signal to the motor controller 44 by way of a differential pressure signal line 72 that represents the level of filter contamination. Likewise, a fuel temperature sensor 74 may measure the fuel temperature in the fuel control system 2 and send a fuel temperature signal to the motor controller 44 by way of a temperature signal line 76. The motor controller 44 may then communicate this information to the engine controller 58 by way of the communication bus 60. It is advantageous to package a portion of the fuel control system 2 described above into a single LRU module 78, as represented in dashed line in FIG. 1. In particular, it is desirable to package the motor controller 44, the pump motor 38, the pumps 14 and 40, the valves 34 and 36, the flow divider 32, the filter 10, the bypass valves 28 and 30 and the sensors 64, 70 and 74 as a single LRU module. This packaging minimises the number of external fuel and electrical connections, thereby improving reliability. Furthermore, this construction allows the pump motor 38 to be coupled directly to the pumps 14 and 40 and the pump motor 38 may operate with a wet stator and rotor to eliminate any dynamic seals.

Described above is a fuel control system that uses a fuel pump powered by a variable speed pump motor controlled by a closed loop electronic feedback system that tracks motor speed and corrects fuel pump motor speed so that the fuel pump delivers flow according to a desired flow schedule. The described embodiment of the invention is only an illustrative implementation of the invention wherein changes and substitutions of the various parts and arrangement thereof are within the scope of the invention as set forth in the attached claims.

What is claimed is:

1. A fuel control system for a gas turbine engine that comprises:
    a fuel pump for delivering fuel from a fuel supply source to the engine;
    a variable speed pump motor for powering the fuel pump;
    an engine controller that senses a fuel pressure signal that represents pressure of fuel that the system delivers to fuel nozzles in the engine to measure delivered fuel pressure, compares the delivered fuel pressure to a fuel flow schedule to generate a motor speed command signal that represents a pump motor speed for a desired fuel flow from the pump; and
    a motor controller that powers the pump motor, compares the speed of the pump motor to the motor speed command signal, senses any variation of the speed of the motor from the motor speed command signal and uses the resulting difference to modulate the power that it sends to the pump motor to make the pump deliver the desired fuel flow wherein the motor controller receives a motor position signal representing angular position of the shaft to compare the speed of the pump motor to the motor speed command signal; and wherein a motor position sensor generates the motor position signal.

2. The fuel control system of claim 1, further comprising a fuel pressure sensor for measuring fuel pressure delivered to the system by the pump that generates the fuel pressure signal.

3. The fuel control system of claim 2, wherein the motor controller receives the fuel pressure signal from the fuel pressure sensor and the motor controller sends a signal representative of this pressure to the engine controller.

4. The fuel system of claim 3, further comprising a communication bus for passing the signals between the motor controller and the engine controller.

5. The fuel system of claim 4, wherein the communication bus comprises a Controller Area Network (CAN) serial bus.

6. A line replaceable unit (LRU) fuel control module for a gas turbine engine fuel control system that has a fuel supply source, an engine controller, a start manifold and a run manifold, comprising:
    a fuel pump for delivering fuel from the fuel supply source to the engine;
    a variable speed pump motor for powering the fuel pump; and
    a motor controller that powers the pump motor, transfers a fuel pressure signal that represents pressure of fuel that the system delivers to fuel nozzles in the engine to measure delivered fuel pressure to the engine controller, receives a corresponding motor speed command signal from the engine controller that represents a pump motor speed for a desired fuel flow from the pump, compares the speed of the pump motor to the motor speed command signal that represents a desired fuel flow for the pump, senses any variation of the speed of the motor from the motor speed command signal and uses the resulting difference to modulate the power that it sends to the pump motor to make the pump deliver the desired fuel flow wherein the motor controller receives a motor position signal representing angular position of the shaft to compare the speed of the pump motor to the motor speed command signal; and wherein a motor position sensor generates the motor position signal.

7. The LRU module of claim 6, further comprising a fuel pressure sensor for measuring fuel pressure delivered to the system by the pump that generates the fuel pressure signal.

8. The LRU module of claim 7, wherein the motor controller receives the fuel pressure signal from the fuel pressure sensor, the motor controller sends a signal representative of this pressure to the engine controller and the engine controller generates the motor speed command signal based on this pressure.

9. The LRU module of claim 8, wherein a communication bus passes the signals between the motor controller and the engine controller.

10. The LRU module of claim 9, wherein the communication bus comprises a Controller Area Network (CAN) serial bus.

11. The LRU module of claim 7, further comprising:
    a start fuel valve for controlling flow from the pump to the start manifold;
    a run fuel valve for controlling flow from the pump to the run manifold; and
    a flow divider for proportioning the flow of the pump between the start manifold and the run manifold.

12. The LRU module of claim 11, wherein the start and run fuel valves comprise solenoid two-way valves.

13. The LRU module of claim 12, wherein the motor controller operates the start and run solenoid two-way valves.

14. A line replaceable unit (LRU) fuel control module for a gas turbine engine fuel control system that has a fuel supply source, an engine controller, a start manifold and a run manifold, comprising:
- a fuel filter for filtering fuel from the fuel supply source;
- a fuel pump for delivering fuel from the fuel supply source to the engine;
- a variable speed pump motor for powering the fuel pump;
- bypass valves for the fuel filter and the fuel pump;
- a start fuel valve for controlling flow from the pump to the start manifold;
- a run fuel valve for controlling flow from the pump to the run manifold;
- a flow divider for proportioning the flow of the pump between the start manifold and the run manifold;
- a motor position sensor measuring angular position of the shaft for generating a motor speed signal;
- a fuel pressure sensor for measuring fuel pressure delivered to the system by the pump that generates a fuel pressure signal that represents pressure of fuel that the system delivers to fuel nozzles in the engine; and
- a motor controller that powers the pump motor, transfers the fuel pressure signal to the engine controller, receives a corresponding motor speed command signal from the engine controller that represents a pump motor speed for a desired fuel flow from the pump, compares the motor speed signal to the motor speed command signal, senses any variation of the motor speed signal from the motor speed command signal and uses the resulting difference to modulate the power that it sends to the pump motor to make the pump deliver the desired fuel flow.

15. The LRU module of claim 14, wherein the motor controller receives the fuel pressure signal from the pressure sensor that is representative of the measured fuel pressure the motor controller sends a signal representative of this pressure to the engine controller and the engine controller generates the motor speed command signal based on this pressure.

16. The LRU module of claim 14, wherein a communication bus passes the signals between the motor controller and the engine controller.

17. The LRU module of claim 16, wherein the communication bus comprises a Controller Area Network (CAN) serial bus.

18. The LRU module of claim 14, further comprising a booster pump.

19. The LRU module of claim 14, further comprising a fuel temperature sensor.

20. The LRU module of claim 14, further comprising a fuel filter differential pressure sensor.

* * * * *